US006728849B2

United States Patent
Kodama

(10) Patent No.: US 6,728,849 B2
(45) Date of Patent: Apr. 27, 2004

(54) REMOTE STORAGE SYSTEM AND METHOD

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 236 days.

(21) Appl. No.: 10/022,306

(22) Filed: Dec. 14, 2001

(65) Prior Publication Data

US 2003/0115433 A1 Jun. 19, 2003

(51) Int. Cl.[7] .............................................. G06F 12/00
(52) U.S. Cl. ..................... 711/162; 711/158; 711/156; 711/114; 707/204; 714/6
(58) Field of Search ................... 711/162, 158, 711/156, 114; 707/204; 714/6

(56) References Cited

U.S. PATENT DOCUMENTS

| | | | |
|---|---|---|---|
| 5,537,533 A | 7/1996 | Staheli et al. | |
| 5,778,165 A | 7/1998 | Saxon | |
| 5,875,479 A | * 2/1999 | Blount et al. | 711/162 |
| 5,889,935 A | 3/1999 | Ofek et al. | |
| 5,909,700 A | * 6/1999 | Bitner et al. | 711/162 |
| 5,933,653 A | 8/1999 | Ofek | |
| 5,937,414 A | 8/1999 | Souder et al. | |
| 5,974,563 A | 10/1999 | Beeler | |
| 6,115,784 A | 9/2000 | Dorricott et al. | |
| 6,122,713 A | * 9/2000 | Huang et al. | 711/147 |
| 6,173,377 B1 | 1/2001 | Yanai et al. | |
| 6,189,079 B1 | 2/2001 | Micka et al. | |
| 6,192,281 B1 | 2/2001 | Brown et al. | |
| 6,269,382 B1 | 7/2001 | Cabrera et al. | |
| 6,301,589 B1 | 10/2001 | Hirashima et al. | |
| 6,308,283 B1 | 10/2001 | Galipeau et al. | |
| 6,308,284 B1 | 10/2001 | Lecrone et al. | |
| 2001/0027480 A1 | 10/2001 | Kriegsman | |

* cited by examiner

Primary Examiner—Matthew Kim
Assistant Examiner—Stephen Elmore
(74) Attorney, Agent, or Firm—Townsend and Townsend and Crew LLP

(57) ABSTRACT

A storage system includes local storage and remote storage. The local storage operates to receive read and write requests to read data from and write data to local storage media. A controller of the local storage maintains a pair table containing the identifications of pairs, each pair being a predetermined storage area of the local storage media and a corresponding storage area of the remote storage area. Data written a storage area is assigned a priority, and a remote copy message is prepared, identifying the data, the assigned priority, and the pair containing the identity of the storage area to which the data is written. The remote copy message is stored in a remote copy queue that is periodically reviewed for pending remote copy messages. Any that are found are compared for priorities. Those remote copy messages with higher assigned priorities result in the corresponding data being sent for storage to the remote storage before those remote copy messages with lower assigned priorities.

7 Claims, 12 Drawing Sheets

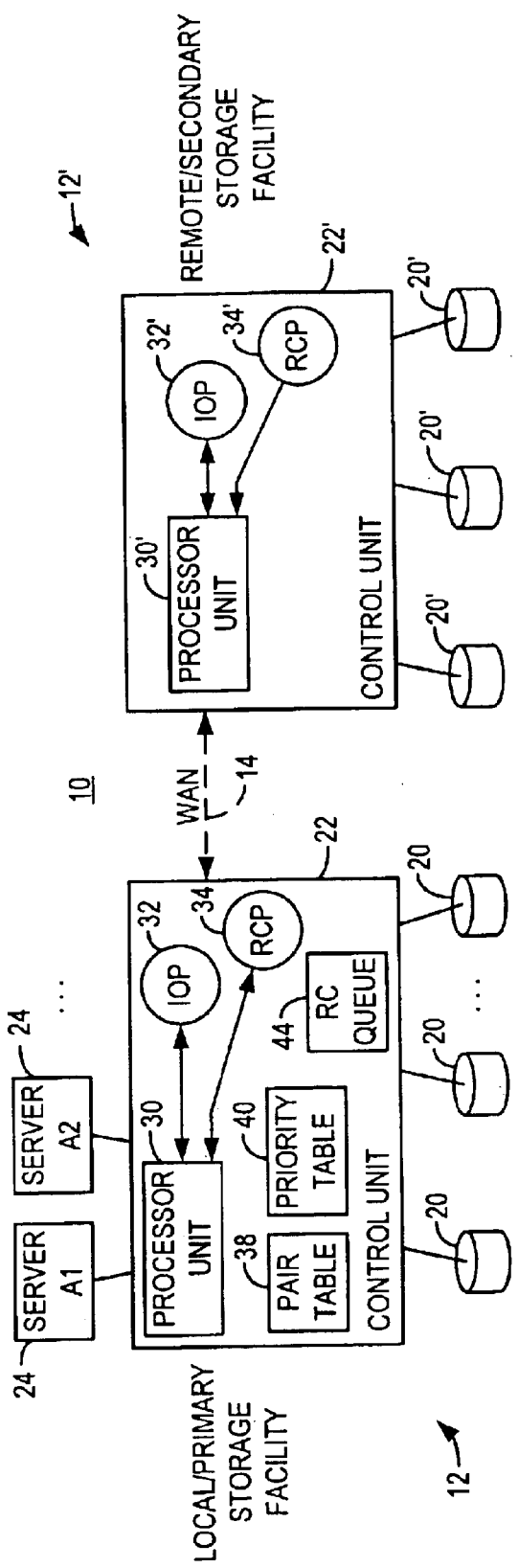

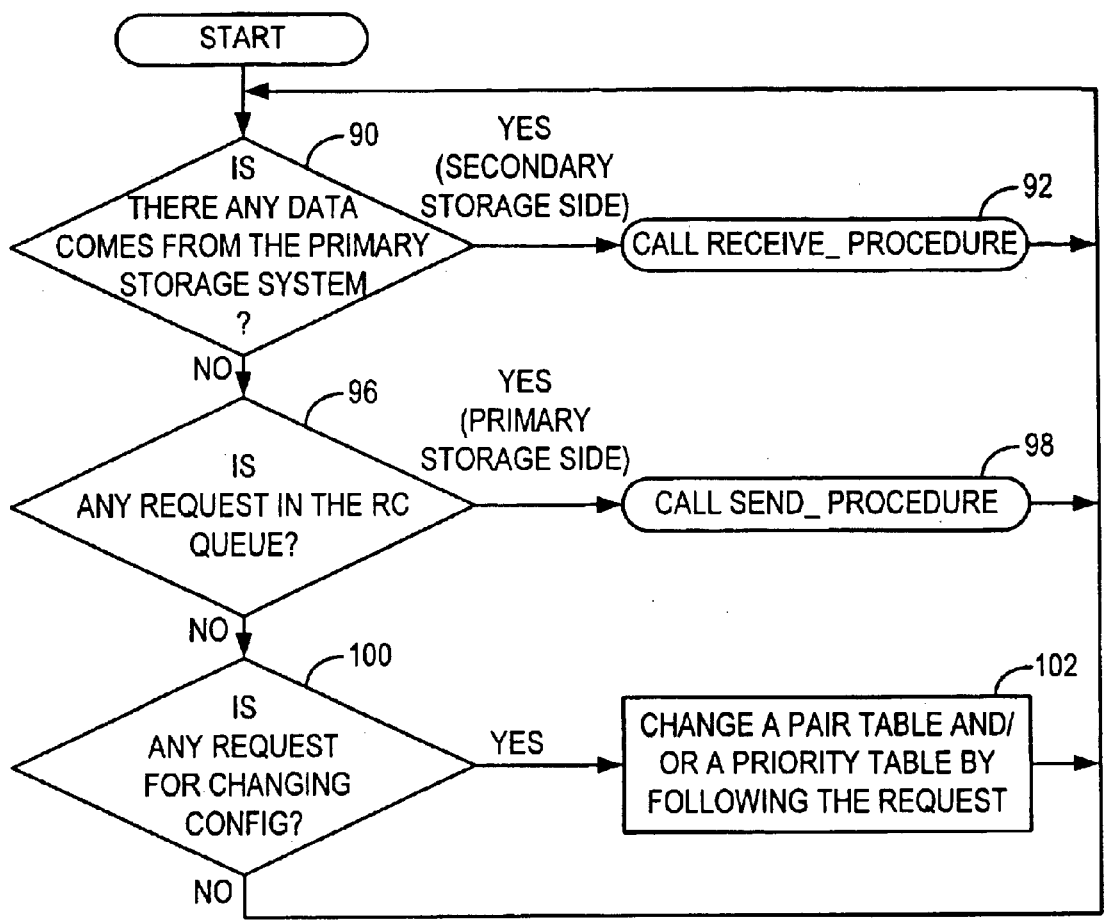
FIG. 6
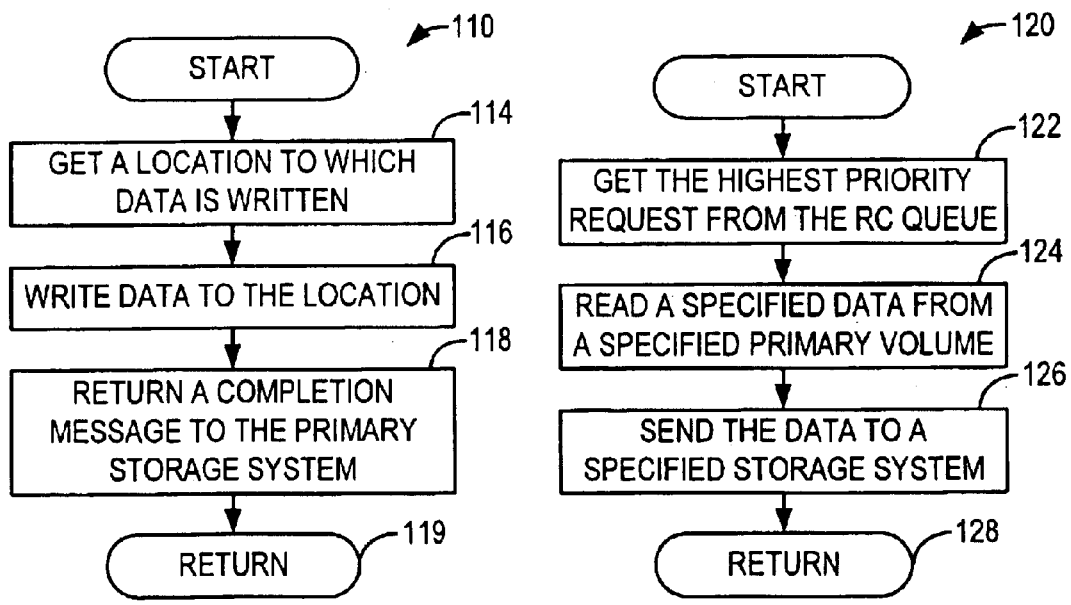
FIG. 7
FIG. 8

Example of Management Console

← 600

| Pair Name | Primary Volume | | Secondary Volume | |
|---|---|---|---|---|
| PAIR1 | Storage System A | Volume A1 | Storage System B | Volume B2 |
| PAIR2 | Storage System A | Volume A2 | Storage System B | Volume B4 |
| ⋮ | ⋮ | ⋮ | ⋮ | ⋮ |
| PAIRN | Storage System A | Volume An | Storage System B | Volume Bm |

602 — Pair Name; 604 — Primary Volume (604a, 604b); 606 — Secondary Volume (606a, 606b); 610(1), 610(2), 610(N)

Pair Table for Block-based Remote Copy

FIG. 12

| Pair Name | Primary Volume | | Secondary Volume | |
|---|---|---|---|---|
| DEV1 | Storage System A | Volume A1 | Storage System B | Volume B2 |
| DEV2 | Storage System A | Volume A2 | Storage System B | Volume B4 |
| ⋮ | ⋮ | ⋮ | ⋮ | ⋮ |
| DEVx | Storage System A | Volume An | Storage System B | Volume Bm |

FIG. 13A

| Pair Name | Dev Name |
|---|---|
| PAIR1 | DEV1 |
| | DEV2 |
| | ⋮ |
| | DEV3 |
| PAIR2 | DEV4 |
| | DEV5 |
| | ⋮ |
| | DEV6 |
| ⋮ | ⋮ |
| PAIRN | DEV7 |
| | DEV8 |
| | ⋮ |
| | DEV9 |

FIG. 13B

| Pair Name | Dev Name | Priority |
|---|---|---|
| PAIR1 | DEV1 | 2 |
| | DEV2 | 1 |
| | ⋮ | ⋮ |
| | DEV3 | 3 |
| PAIR2 | DEV4 | 1 |
| | DEV5 | 2 |
| | ⋮ | ⋮ |
| | DEV6 | 4 |
| ⋮ | ⋮ | ⋮ |
| PAIRN | DEV7 | 4 |
| | DEV8 | 1 |
| | ⋮ | ⋮ |
| | DEV9 | 2 |

FIG. 14

| Pair Name | Primary File/Directory | | | Secondary File System | |
|---|---|---|---|---|---|
| PAIR1 | Storage System A | FileSystem A1 | File A1 | Storage System B | Volume B1 |
| PAIR2 | Storage System A | FileSystem A2 | Dir A5 | Storage System B | Volume B2 |
| ⋮ | ⋮ | ⋮ | ⋮ | ⋮ | ⋮ |
| PAIRN | Storage System A | FileSystem An | File Ay | Storage System B | Volume Bm |

*FIG. 15*

| Priority | 2 | |
|---|---|---|
| Primary | Storage System A | Volume A1 |
| Secondary | Storage System B | Volume B2 |
| Address | 13 | |
| Size | 8KB | |

*FIG. 16*

| Priority | 2 | |
|---|---|---|
| Primary | Storage System A | Volume A1 |
| Secondary | Storage System B | Volume B2 |
| File Name | /usr/file1 | |
| Offset | 520 | |
| Size | 1024 | |

*FIG. 17*

REMOTE STORAGE SYSTEM AND METHOD

BACKGROUND OF THE INVENTION

The present invention relates generally to data storage systems. More particularly, the invention is directed to a data storage system that includes a local data storage facility that is mirrored by a geographically remote backup data storage facility.

In today's commercial environment, maintaining some form of backup of data is no longer a luxury, but a necessity. A company's financial health so relies upon the data it keeps that loss, corruption, or theft of that data can be economically disastrous. To protect against such loss, a number of data storage solutions have been considered.

Many of those solutions rely upon transfer of the data, on a periodic basis, from the main data storage facility to some form of storage medium for protective custody elsewhere. This "elsewhere" may be in the same general locale (e.g., same floor of a building, or somewhere in the same office complex) as the original data. This approach provides a backup should the main storage facility fail or the data is severely corrupted. However, the approach assumes the risk of data loss, both original and backup, in the face of truly disastrous events such as fires, floods, or earthquakes. Accordingly, many businesses eschew this approach in favor of locating a backup storage facility geographically remote from the main storage facility, for example in another city or state. This latter approach allows recovery from catastrophic events that may destroy the main storage facility yet not touch the remote storage facility by keeping a copy of the data created and maintained at the main storage facility at the remote storage facility.

"Remote copy" is one of the technologies presently being used for replicating data at a remote storage facility. When employed, this technology will perform a data transfer from the main or local storage facility to the remote storage facility each time data is written and/or updated to a storage device of the local facility. However, even this approach has problems. Many implementations of remote copy technologies use a wide area network, such as the Internet as the medium for transferring data from the local storage facility to the remote storage facility. When large amounts of data is being transferred, the transfer speed can result in data loss should a catastrophic event occur before or during the remote cop operation of data transfer to the remote storage facility. This is not such an infrequent possibility, because in many instances the update must wait for the availability of the network at the local storage facility, lengthening the window for data loss from a catastrophic event.

It should be evident that the risk of losing data should be minimized.

BRIEF SUMMARY OF THE INVENTION

The present invention is a method, and apparatus for implementing that method, of performing a remote copy transfer of data from a local storage facility to a geographically remote storage facility on a prioritized basis. Data is assigned a priority at the local storage facility based upon the importance of that data. Some data will have a high priority, other data a lower priority. Data is transferred according to the assigned priorities.

Broadly, the present invention is directed to a data processing system having a main or local storage facility for storing data and at least one geographically remote storage facility that mirrors the data stored at the local storage facility. Generally, data is stored at the local storage facility in predefined "storage areas," which may be disk storage devices, files (for those storage systems using file-level I/O), or blocks (for storage systems using block-level I/O). Maintained at the local storage facility is a pair table that identifies pairs of storage areas, one of the pair being a storage area of the local storage facility and the other being a corresponding storage area of the remote storage facility. Associated with each of the pairs is an assigned priority.

Changes to the data, prompted by write requests received by the local storage facility, will initiate a remote copy operation that results in a transmission of the changed data to the remote storage facility. A remote copy request, identifying the data to be transferred, and the corresponding pair of storage areas affected, is created and queued. Periodically, the queue is reviewed, and thost remote copy requests associated with storage areas with an assigned higher priority are transmitted first, followed by data written to a storage areas assigned a lower priority.

A number of advantages should be evident from the present invention. First, critical data is backed up at the remote storage site as quickly as possible. No longer will such data risk loss by waiting for transmission of less critical data.

These and other aspects and advantages of the present invention will become apparent to those skilled in this art upon reading of the following detailed description of the invention, which should be taken in conjunction with the accompanying drawings.

BRIEF DESCRIPTION OF THE DRAWINGS

FIG. 1 is a block diagram of a data processing system, including a data storage system having a local and a (geographically) remote storage facility, that incorporates and broadly illustrates the basic concepts of the present invention;

FIG. 2 is an illustration of a pair table maintained and used by the local storage facility shown in FIG. 1;

FIG. 3 illustrates the structure of a priority table maintained and employed by the local storage facility used by the invention of FIG. 1;

FIG. 6 illustrates the steps taken by a remote copy procedure;

FIG. 7 illustrates the steps of a receive operation at the remote storage facility to receive data transmitted by the local storage facility of FIG. 1 for backup;

FIG. 8 illustrates the steps taken by the local storage facility of FIG. 1 to send remote copy data that has been written or otherwise modified to the remote storage facility for backup;

FIG. 12 is an illustration of a pair table of the present invention as may be used by a storage system using block level I/O protocols;

FIGS. 13A, 13B, and 14 respectively illustrate different implementations of a pair table according to the present invention;

FIG. 15 illustrates a pair table as may be used for a file level I/O storage system;

FIG. 16 illustrates the format of a remote copy (RC) request for a block level I/O system; and FIG. 17 illustrates the format of an RC request for a file level I/O system.

DETAILED DESCRIPTION OF THE INVENTION

Figure 4:
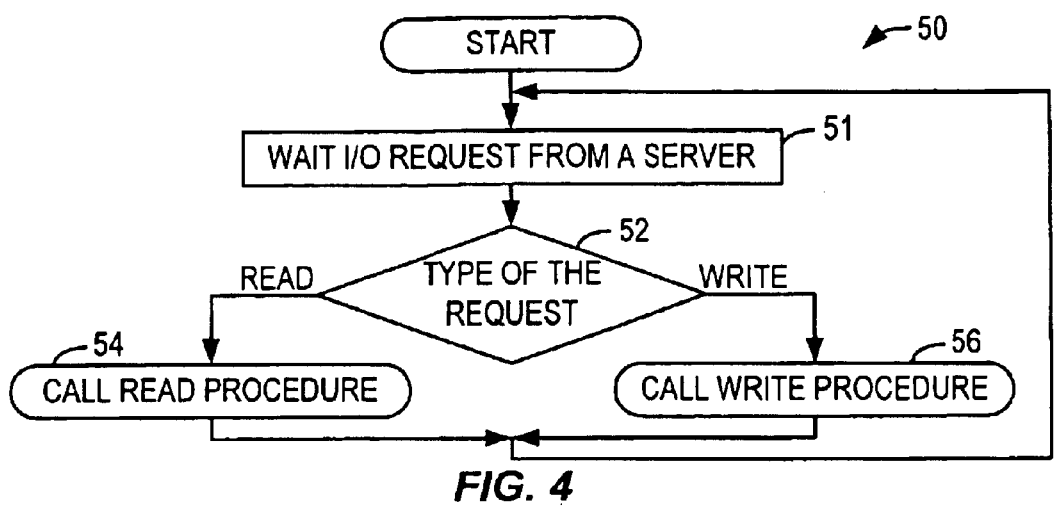
FIG. 4 illustrates the initial steps performed by the local storage system of FIG. 1 taken in response to receipt of a I/O request.

Briefly, the invention is a method of prioritizing data backups via a remote copy to ensure, as much as possible, that critical data that is modified or written to a local data storage is copied to a procedure remote storage where it can be made available in the event some catastrophic event damages, corrupts or otherwise destroys the original (local) data.

Turning first to FIG. 1, there is broadly illustrated, in block diagram form, a data processing system for that implements the major features of the present invention. FIG. 1 shows, the data processing system, designated generally with the reference numeral 10, includes a storage system comprising a local storage facility 12 and a geographically remote storage facility 12' communicatively interconnected by, for example, a wide area network (WAN) 14.

The storage facilities 12, 12' may be virtually any size, but as will be seen, the present invention is particularly advantageous when used in connection with very large storage systems. Accordingly, the storage facility 12 will include a storage medium capable of storing large amounts of data such as multiple tape or disk units. Often, for such large storage capability, an logical file management system is used in which logical volumes map to predetermined portions of the storage space. As is conventional, there may included in memory (not shown) or elsewhere data structures that implement "logical" storage, comprising a number of logical storage units or "volumes" to which I/O requests, both reads and writes, are made by the host systems. Each logical storage unit has a designated corresponding physical storage area in the storage media. Data is written to a predetermined one of the logical storage units, and thereby to the physical storage media implementing the logical storage. Accordingly, the term "volume" is used herein to identify media storage used as each of the local and remote storage facilities 12, 12', it being understood that such volume or volumes may be implemented by any storage type such as a plurality of disk units or tape units.

Thus, FIG. 1 shows the data storage facilities 12 and 12' as having a plurality of volumes 20. A control unit 22 operates to manage and access the volumes 20 in response to I/O read or write requests from one or more servers 24. The control unit 22 broadly includes a processor unit 30 on which executes an input/output process (IOP) 32 and a remote copy process (RCP) 34. The IOP 32 manages a pair table 38 and a priority table 40, which are respectively shown in greater details in FIGS. 2 and 3. In addition, the IOP 32 also manages a remote copy queue 44.

The remote storage facility 12' is a mirror of at least that portion of the local storage facility 12 that needs to be backed up for disaster protection, and includes disk volumes 20' and a control unit 22'. The control unit 22' comprises, including a processor unit 30' on which executes input/output and remote copy processes 32', 34' that operate to received data send by the local storage facility 12 for backup storage on the volumes 20' as will be discussed further below.

As is conventional, pre-determined storage areas are established on the volumes 20 (and correspondingly on the volumes 20') according to the particular storage architecture and protocol used to implement the local and remote storage facilities 12. For example, if a file-level I/O is used, the control unit 22 will be file-intelligent so that it can respond to file-level I/O requests from a server 24. Typically, a mega data library will be maintained to identify the physical location of data at which the requests will be processed according to I/O requests from the servers 24. On the other hand, the local storage system 10 may be implemented to use block-level I/O, in which case the storage areas will be storage blocks identified by their location on the volumes 22. Implementation of the present invention using each of these different I/O protocols is described in more detail hereinafter. Whatever protocol the local storage facility 12 uses, block-level I/O or file-level I/O, will be mirrored by the remote storage facility 12' for sake of simplicity.

Whether file-level or block-level I/O is used, data will usually be stored in predetermined storage areas (e.g., files or blocks) of one or another of the volumes 20. Requests received by the control unit 22 from a server 24 will contain an identification of the storage area (A(1), A(2), . . . A(N)) and the volume 20 carrying that storage area. Each storage area of the local storage facility 12 will have a corresponding storage area (B(1), B(2), . . . B(N)) implemented on the mirror volumes 20' of the remote storage facility 12'. Pairs of the storage areas, one on a volume 20 and a corresponding one on a volume 20' are identified by the pair table 38, shown in greater detail in FIG. 2. For example, as illustrated in FIG. 2, a local storage area A(1) and its corresponding remote storage area B(1) are identified in the pair table 38 as pair number 1. Similarly, pair number 2 identifies the local and remote storage areas A(2), B(2), while pair 3 identifies the local and remote pairs A(3), B(3), and so on to the last pair N, comprising storage areas A(N) and B(N).

In addition, according to the present invention, each of the pairs of storage areas are assigned a predetermined priority level. The priority table 40, shown in greater detail in FIG. 3, contains an identification of each storage area pair and its assigned priority. Assuming a "1" is the highest priority, and a "5" is the lowest, the pair table 40 shows that pair 1 (comprising storage areas A(1) and B(1), FIG. 2) is assigned a priority of 4, while pair N is assigned a priority of 1.

The local storage facility 12 operates in a conventional fashion to honor read and write requests from the server 24 with accesses to the volumes 20. At some initial point, data carried by the volumes that is desired to be preserved will be identified by the storage areas (A(1), A(2), . . . etc.) of the storage area pairs listed in the pair table 38 and copied over to the corresponding storage areas (B(1), B(2), . . . etc.). Thereafter, additions, deletions, changes, and the like to the data of storage areas of volumes 20 identified in the pair table 38 should be copied to the corresponding storage areas of volumes 20' of the remote storage facility to preserve that data. Accordingly, the control unit 22 will accompany write operations with a remote copy operation to mirror local changes effected by the write operation at the remotely-located volumes 20'.

To accommodate large numbers or write operations as may be expected at any moment in time in large or massively parallel storage systems, data to be copied to the remote storage facility 12' will be placed on the RC queue 44 to waiting transfer to the remote storage facility 44. (Preferably, the data itself is not placed on the RC queue 44. Rather, a remote copy message is inserted in the queue with information concerning the data to be copied, including the priority of the data and a pointer to the data itself, which may be on the volumes 20, or in cache memory—not shown.) As mentioned above, certain data changes may be more important than other data changes, and therefore may rate a higher priority. In this example, the priority is based upon the particular storage area at which the data is stored. However, as will be seen below, other aspects may dictate the basis for priority assignment.

FIG. 4 broadly illustrates the steps taken by a request handling process 50 to handle I/O requests received from a server 24. As FIG. 4 shows the request handling process 50 will remain in a wait state (step 51) until an I/O request is received, periodically checking to see if an I/O request is received from a server 24. When such a request is received, the request handling process 50 will then segue from step 51 to step 52 where it will check the request to determine its type, i.e., whether it is a read or a write request. If it is determined that the received request is to read data from the volumes 20, step 52 will be exited in favor of a call, in step 54, of a conventional read procedure (not shown) in which the requested data will be read from its location (specified in the request) on the volume 20 and passed to the requesting server 24. A return from the read procedure will return the IOP 32 to step 50 to await another I/O request.

Figure 5:
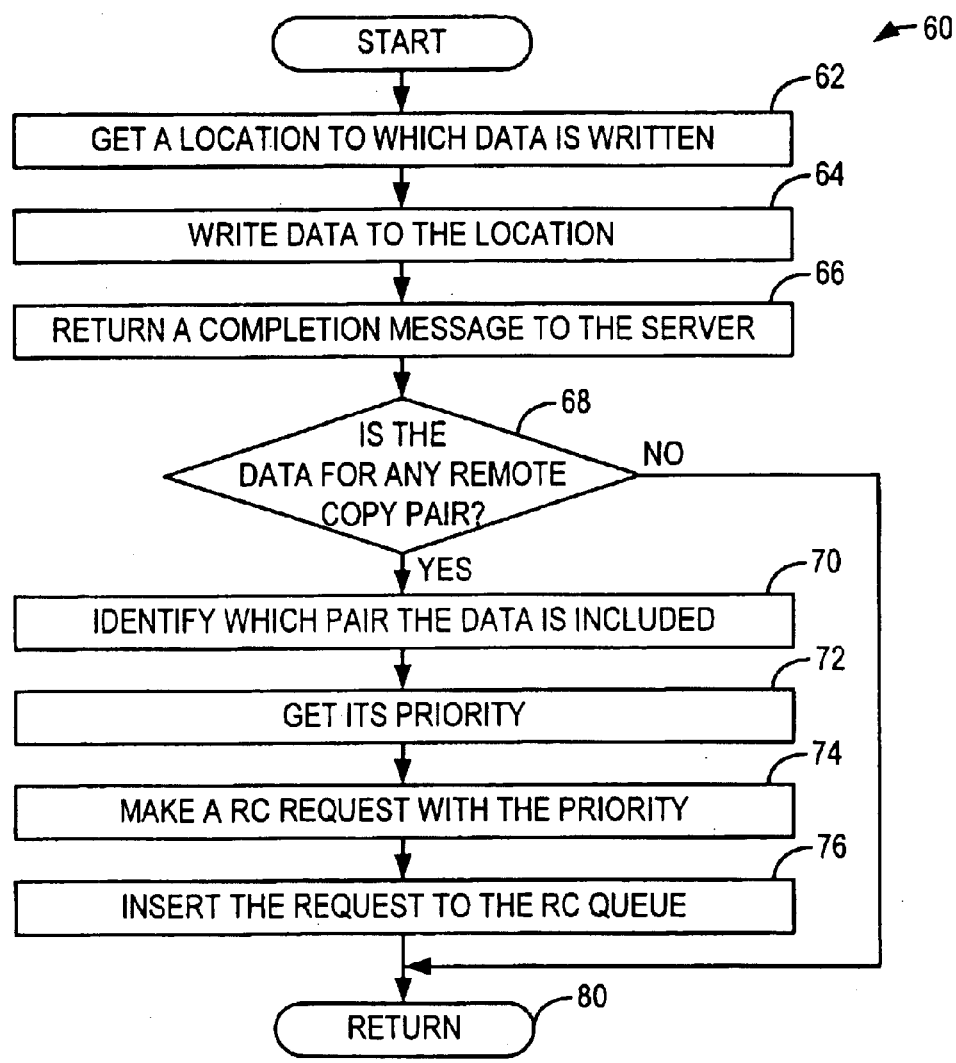
FIG. 5 illustrates the steps of the procedure called by FIG. 4 to perform a write operation.

If, on the other hand, it is determined that the received I/O request 51 is a write request, step 52 is exited in favor of step 56 which executes a call to a write procedure 60, shown in FIG. 5. Referring to FIG. 5, the call from step 56 of the request handling process 50 will initiate operation of the write procedure 60 with step 62 in which the storage area (e.g., A(3)) at which the data is to be written is determined. Once determined, the data is written, in step 64, to that location. Next, in step 66, a completion message is returned to the requesting server 24, followed by a determination, in step 68, of whether or not the data was written to a storage area that is the subject of a remote copy pair, i.e., was the data written to a storage area identified in the pair table 38 (FIG. 1). Accordingly, the IOP 32 will review the pair table 38. If the particular location (storage area) is not found in the pair table, step 68 is exited in favor of a return (step 70) to the calling procedure, here step 56 (FIG. 4), of the request handling process 50.

On the other hand, if the storage area that was written is found to be one that is identified in the pair table, e.g., storage area A(3), step 68 is exited in favor of step 70 where the pair number corresponding to the storage area identified by review of pair table 38 (FIG. 2), which shows the storage area A(3) to be in pair 3. Then, in step 72, using the pair identification supplied by the pair table 38, the priority of that pair is obtained from the priority table 40 (FIG. 3). With the priority, the write procedure 60 will construct a remote copy (RC) request that identifies the local storage area that was written (here, A(3)), corresponding storage area at the remote storage facility 12', and the priority of the pair. Then, in step 76, the request is inserted in the RC queue 44 and the procedure 60 moves to step 80 to return to the call 56.

As indicated above, the RCP 34 running on the processor unit 30 has a counterpart in the control unit 22' of remote storage system 12 (RCP 34'). However, due to their respective locations, they perform different operations. FIG. 6 illustrates these different operations.

FIG. 6 shows the major steps performed by the RCP 34 and 34'. A first step 90 is performed by the RCP 34' executing on the processor unit 30' of the remote storage facility 12', and is a check to see if any data is being received via the WAN 14. If so, step 90 will then move to step 92 to issue a call for a receive procedure 110 to handle receipt of incoming data to be copied to the volumes 12', the steps of which are shown in FIG. 7.

If, on the other hand, it is RCP 34 at the local storage system 10, step 90 (and 92) is transparent. Rather, step 96 executes, in which the RC queue 44 is periodically examined to determine if there are any remote copy requests waiting in the RC queue 44. If so, step 96 is left in favor of step 98 to call a send procedure 120, shown in greater detail in FIG. 8 and discussed below, in step 98.

If the RCP 34 finds that there is no request then present in the RCP queue 44, step 96 is left in favor of step 100 to see if a request is pending to change the configuration of either the pair table or the priority table. If so, step 102 allows such changes to be made. Requests for configuration changes of the pair table or priority table may be made through a system administrator console (not shown) which forms a request according to the desires of the systems administrator, and forwards that request, via the servers 24, to the control unit 10 for action.

FIG. 7 illustrates the steps taken by the receive procedure 110 of RCP 34' at the remote storage facility 12'. Incoming remote copy transmissions from the local storage facility 12 are received by the processor unit 30' and queued. Each remote copy transmission includes the information drawn from the RC request, i.e., the identifications of the storage area written at the local storage system 10, (e.g., A(3)) the corresponding remote storage area (B(3)) 30. The remote RCP 34' will retrieve the message, obtain the information concerning the location at which the data shall be stored (step 110), and, in step 112, write to the defined location. Then, in step 114, the received procedure will return a completion message, via the WAN 14 to the local storage facility 12 and, in step 116, return to RCP' operation in step 92.

The send procedure 120 called by step 98 (FIG. 6) of the (local) RCP 34 is illustrated in FIG. 8. As FIG. 8 shows, the send procedure 120 will examine the RC request pending and being held in the RC queue 44, in step 22, to identify the request or requests having the highest priority. Finding those, it will select one (if more than one exists) and from the information provided (e.g., the local storage area written) will read the data that was earlier written from the local storage area A(3), and in step 126 send that data with the associated identifying material (i.e., the local and remote storage areas, and address of the date) to the remote storage system 10 via the WAN 14. Then, in step 28, a return is made to the step 98 of the RCP operation shown in FIG. 6.

As indicated above, implementation of the local and remote storage facilities 12, 12' may assume different architectures depending upon the particular file system and protocols used, i.e., whether file-level I/O, block-level I/O, or other file systems. Shown in FIGS. 9–12 are examples of such differing architectures.

Figure 9:
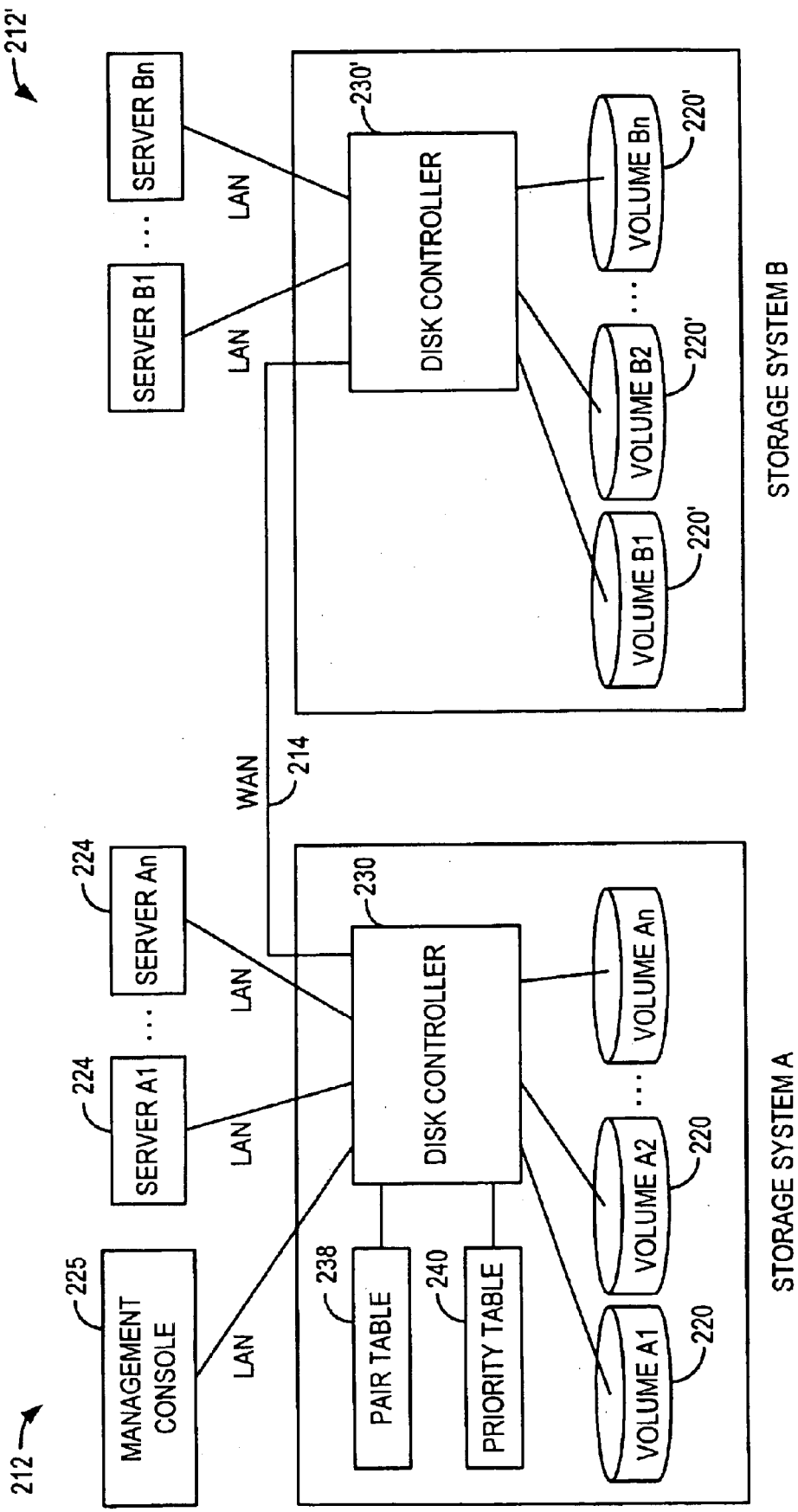
FIG. 9 is a block diagram of a data storage system constructed according to the present invention with local and remote storage facilities implementing block-level I/O.

Referring first to FIG. 9, local and remote storage facilities 212, 212' implement a storage system using block-level I/O protocols, for example either a small computer system interface (SCSI) or a Fibre Channel protocol for server-storage system communication. The local storage facility 212 connects to servers 224 by, for example, a conventional local area network (LAN) connection. A disk controller 230 executes a block I/O process to handle I/O read and write requests between the servers 224 storage volumes 220. A remote copy process (not shown in FIG. 9) will be executing on the disk controller 230. Available to both of the block I/O and remote copy processes are a pair table 230 and a priority table 240 structured generally as described above.

The remote storage facility 212' shown in FIG. 9 will be structured to substantially mirror the local storage facility 212 optionally, to the point of having servers 224' that mirror the (local) servers 224. The remote storage facility 212' includes a disk controller 230' and storage volumes 220'. Servers 224' connect to the remote storage facility 212' by LAN connections. The local and remote storage facilities 212, 212' communicatively connect to one another via their respective disk controllers 230, 230'.

The local and remote storage facilities 212 and 212' are structured to operate in the same manner as the storage systems 12, 12', of FIG. 1, described above. Read operations are handled in conventional fashion by the disk controller 230. Write requests are also handled in conventional fashion to write the data to the disk volumes 220, but in addition the write operation will involve an RC request being inserted in an RC queue (not shown in FIG. 9). The RC queue is periodically checked for pending RC requests by the remote copy process executing on the disk controller 230. If more than one RC request is found, the RC process will compare the priorities associated with each request and, beginning with those request having the higher priorities, read the data identified in the request for communication over the WAN 214 to the remote storage facility 212'.

At the remote storage facility 212', the disk controller 230' receives the data communicated, and writes it to the specified location of disk volume 220' corresponding to the location at which the data was written in disk volumes 220 of the local storage system.

FIG. 9 also shows a management console 225 communicatively coupled to the disk controller 230 by the LAN. The management console provides an entry to the storage facility 212 for configuration changes, such as changing the priority of the pairs or re-identifying specific pairs.

Figure 9A:
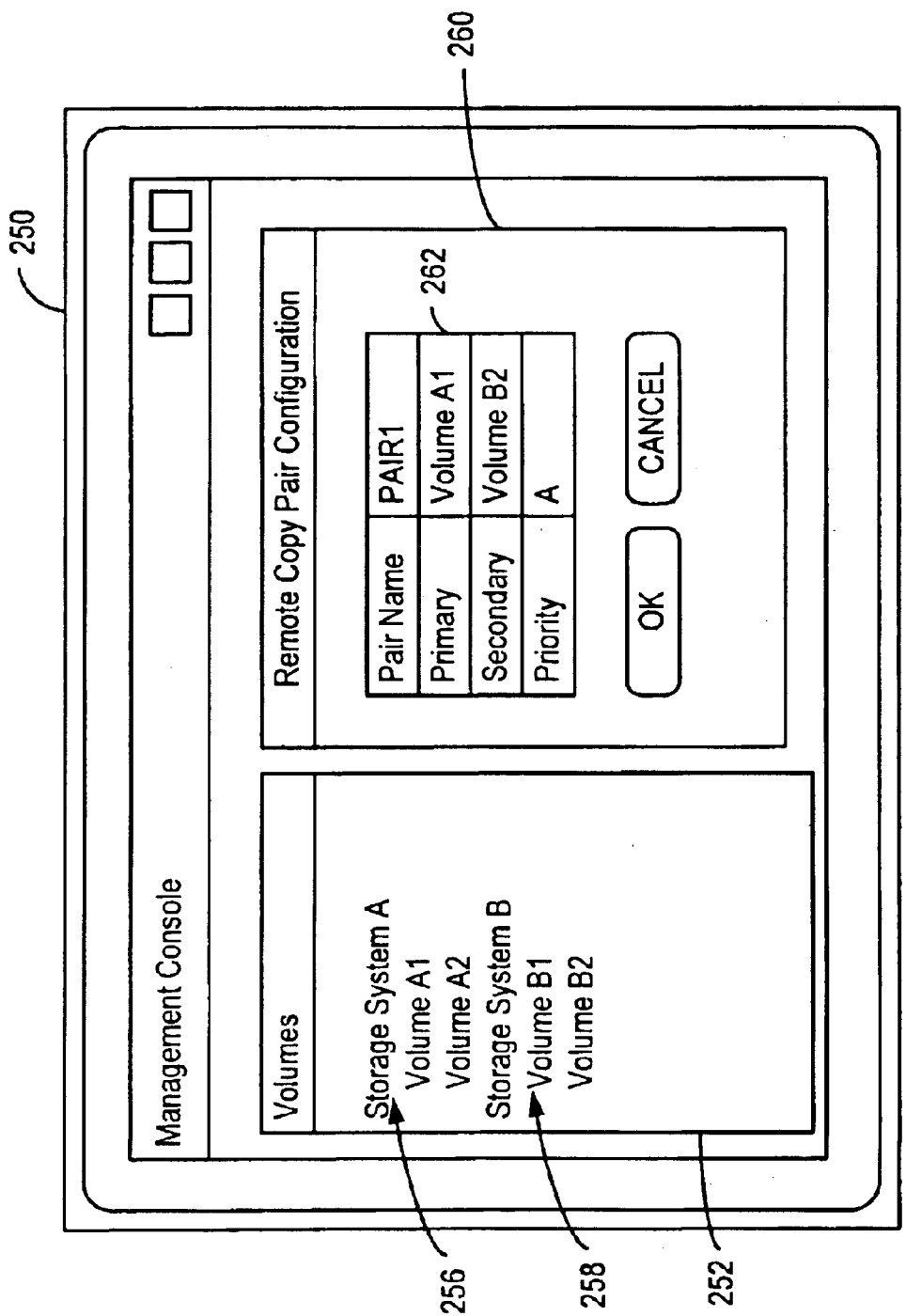
FIG. 9A is a representative GUI presentation as may be presented on a management consolf of the system of FIG. 9.

FIG. 9A shows a representative display to 50 that may be presented on a display screen of the management console 225, allowing a system administrator to review and/or configure or reconfigure the pair and priority tables of a storage system. As FIG. 9A shows, the screen 250 presents a graphical user interface (GUI) having window sections 252 and 260. The window section 252, identified with the notation "Volumes" provides the identification of the volumes for each storage facility, i.e. the local and remote storage facilities 212, 212', of FIG. 9. In the window 260, labeled "Remote Copy Pair Configuration," there is presented a table 262, identifying a particular pair of volumes, the volume ("Volume A1") located at the local storage facility 212, and a secondary volume ("Volume B2") by their pair name ("PAIR 1"). Also shown is the priority ("A") assigned the particular pair. Through the screen, with an appropriate input device (e.g., keyboard) a system administrator may change the information presented such ass pairing the primary volume (Volume A1) of the locl storage facility with another (e.g., Volume B1) volume of the remote storage facility, or change its priority. When any changes to the configuration are complete, the management console will send the configuration to the local storage system 212, and a remote copy process will receive the message and change the pair table and the priority table.

Finally, as with FIG. 1, the servers 224' of remote storage facility 212', may be provided with servers mirroring those of the local storage facility 212, may optionally be included for failover purposes should an event of catastrophic proportions either bring down the servers 224 along with the local storage facility 212, or terminate any communicative connection to the remote storage facility 212' in the face of destruction of the local storage facility.

Figure 10:
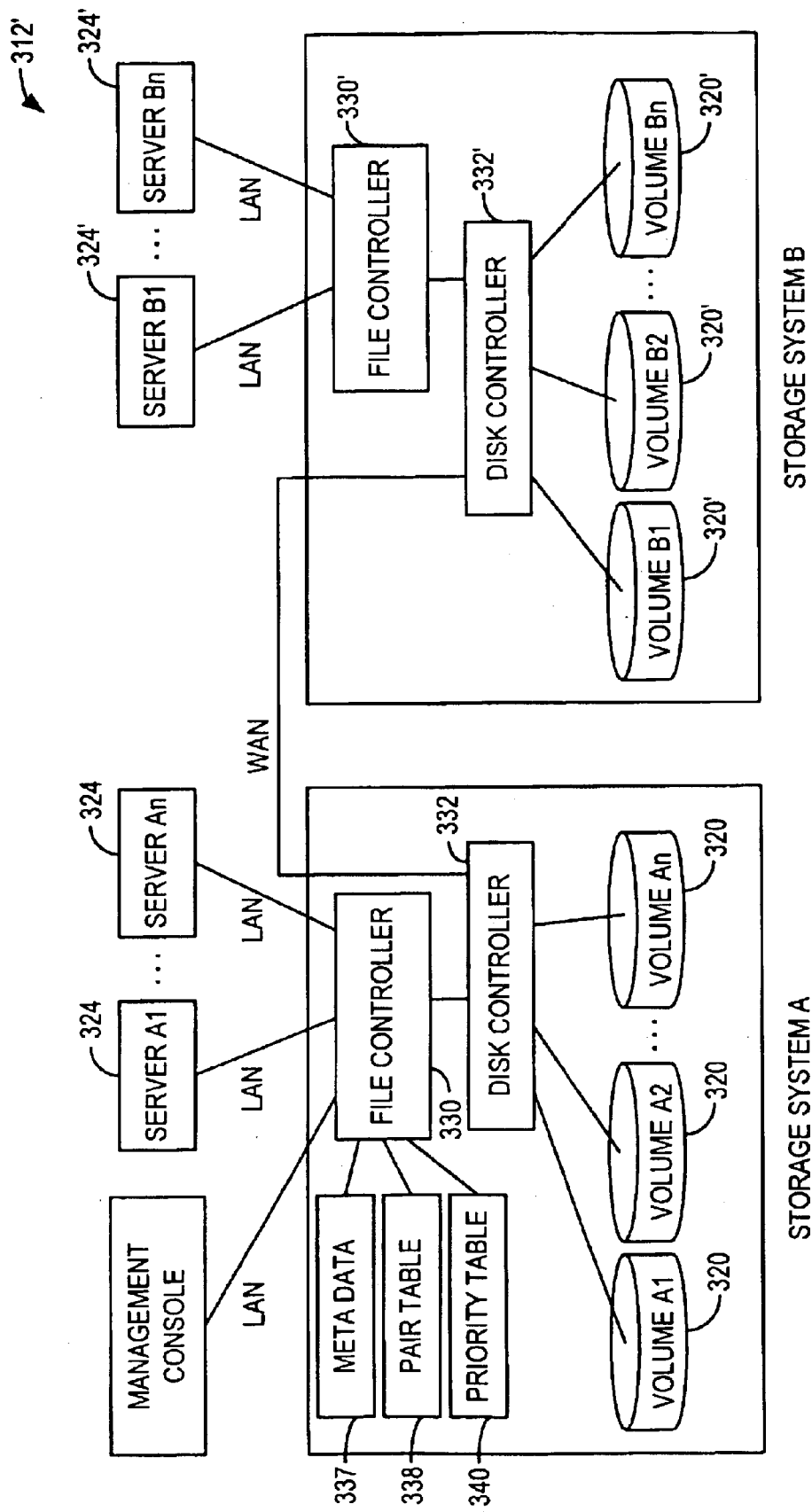
FIG. 10 is an implementation of a data storage system structured to employ the present invention in connection with use of file-level I/O protocols.

Referring now to FIG. 10, there is illustrated a configuration of a storage system 300 having local and remote storage facilities, here designated with the reference numerals 312, 312', structured to use the file-level I/O protocols. As FIG. 10 shows, the local storage system 312 uses at least one file controller 330 for handling I/O read and write requests received from the servers 324. A disk controller 332 operates to control accesses to the volumes 320.

Running on the file controller is a file I/O process that, by messaging the disc controller 332, initiates reads and writes of a file pursuant to received file I/O requests from the servers 324. Typically, the file controller 330 will implement a Network File System (NFS) or a Common Internet File System (CIFS) communication protocol with the servers 324. Read sequences initiated by the file controller 330, in response to read requests from the servers 324, are conducted in conventional fashion. Write requests are modified to implement the present invention, and accordingly the file controller 330 will maintain three tables: a meta data table with information as to the locations of files on volumes 320, along with the file attributes (e.g., name, size, creation date, etc.) as is usual; a pair table, as described above, and a priority table, as also described above.

Figure 10A:
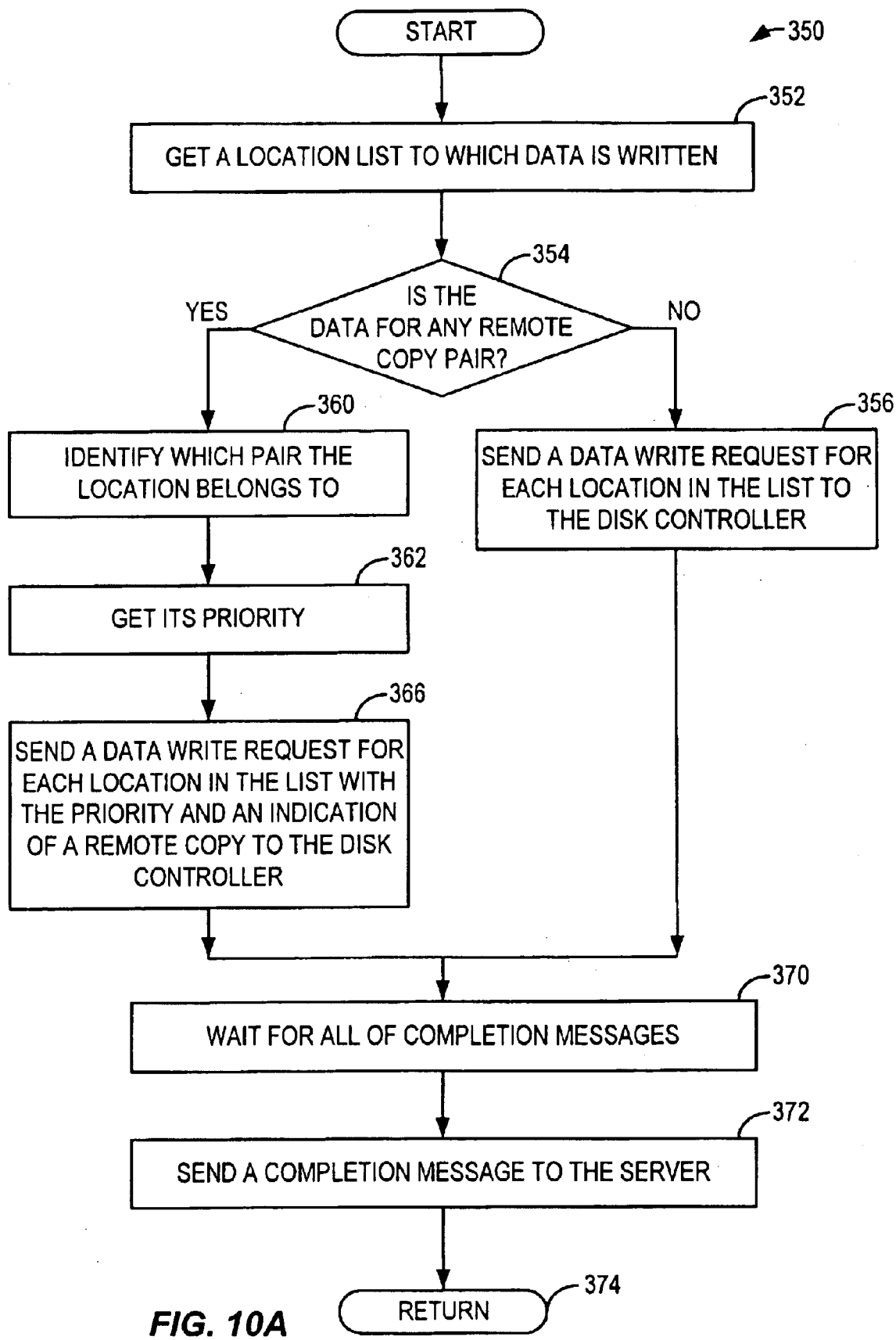
FIGS. 10A and 10B illustrate the steps taken by the storage system of FIG. 10 for a write operation in response to a received I/O write request.

Write operations, in response to received write request, are performed generally according to the write procedure 350 outlined in FIG. 10A. A file I/O process will call the write procedure 350, which, beginning with step 352, obtains from the meta data table 337 a location list that identifies where the data is to be written. It may be that the data will be written a multiple locations on the volumes 320 in order to implement a fault tolerant and/or distributed storage system similar to that described in U.S. Pat. No. 6,108,750. The procedure 350 will then, in step 354, review the pair table 338 to see if the data of the received I/O write request is to be stored in a storage area corresponding to a pair that is subject to remote copying. If not, step 354 will be followed by step 356 in which the procedure 350 will send, to the disk controller 332, a data write request for each location contained in the list.

Next, step 370 will wait for completions of all requests sent in step 356, and when those completions have been returned a completion message will be sent to the server that initiated the I/O write request (step 372). The procedure will then exit at step 374.

If it is found, in step 354, that the data will be written to a storage area that is identified as being one of a pair in the pair table 338, step 354 is exited in favor of step 360 to identify the pair using the pair table 338. Then, in step 362, using the identified pair, the priority table 340 is accessed to obtain the previously assigned prioritization of the pair and, in step 366, a data write request for each location to be written is sent to the disk controller 332, together with an indication that the data is subject to a remote copy. Thus, the write request will include the priority of the pair and the identification of the pair, including the location (or locations) at which the data will be written at the remote storage system 312.

Once the data write requests are transferred to the disk controller, the procedure 350 will, again, wait for completion messages in step 370, and send a completion message to the requesting server in step 372, exiting at step 374.

Figure 10B:
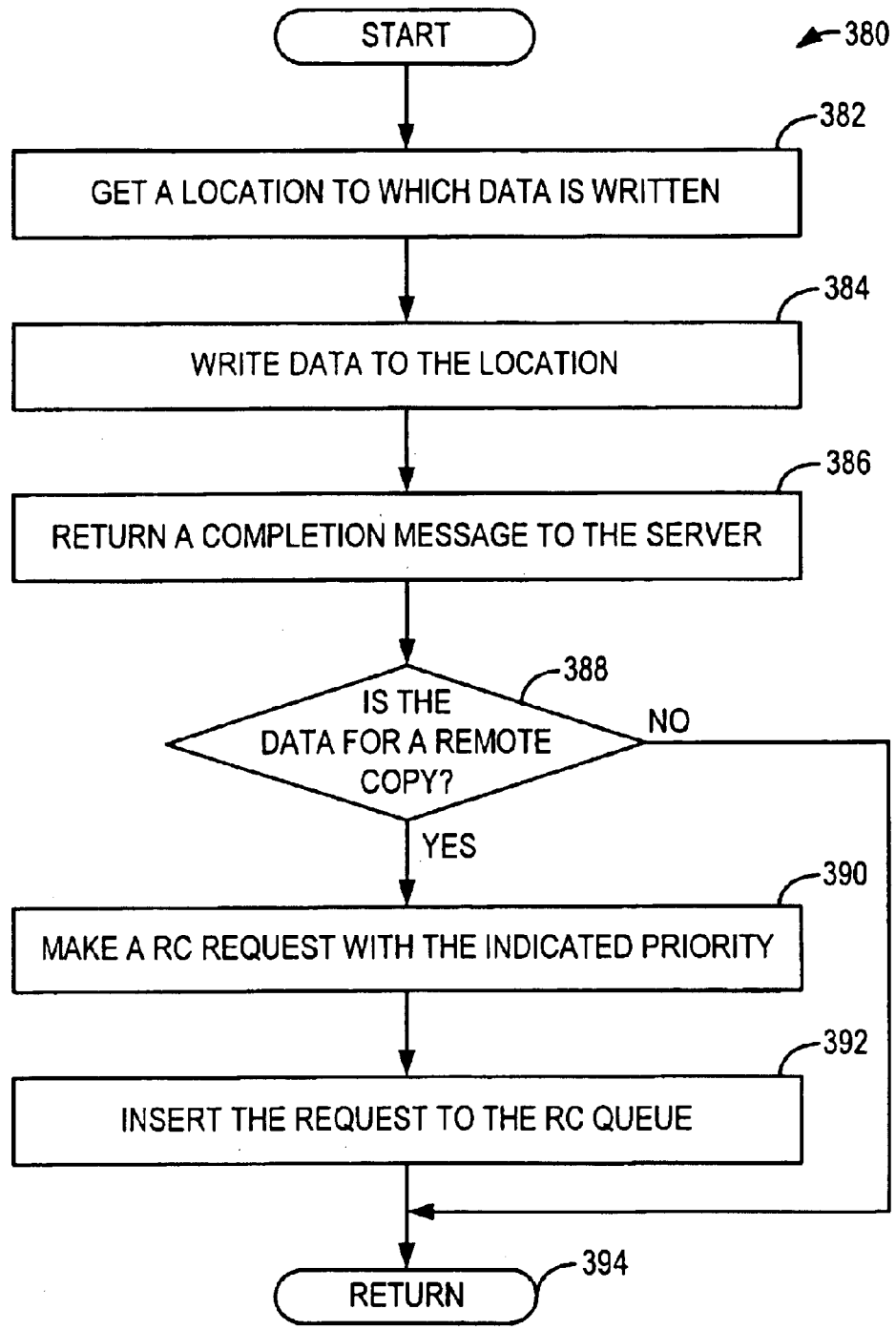

There are two processes running on the disk controller 332: a block I/O process and a remote copy process. The block I/O process handles the data read and write requests received from the file controller to access the volumes 320 for retrieving data to be read, or writing data to be written. The major steps of the write procedure 380 are shown in FIG. 10B. When a data write message is received from the file controller 330, the write procedure 380 of the block I/O process will determine the location (or locations) at which data will be written (step 382), and the data is written in step 384. In step 386 a completion message is returned to the file controller 330, followed by a check, in step 388, of whether or not the data is the subject of a remote copy, i.e., did the data request message received from the file controller 330 indicate that this should be the subject of a remote copy operation. If not, the write procedure 380 will exit step 388 in favor of a return to the block I/O process in step 394.

If, however, the data that is written is to be the subject of a remote copy operation, step 388 will exit in favor of step 390 where an RC request with its indicated prioritization is constructed and, in step 392, inserted in an RC queue (not shown). Then, the write procedure 380 will exit at step 394.

The operation of a remote copy is essentially the same as outlined above in connection with steps 5–8, differing only in the particular implementation of the system as needed. Similarly, operation at the remote storage system 312 is also basically the same, except that it is the disk controller 332' of the remote storage system 312 that handles receipt and writing operations.

Figure 11:
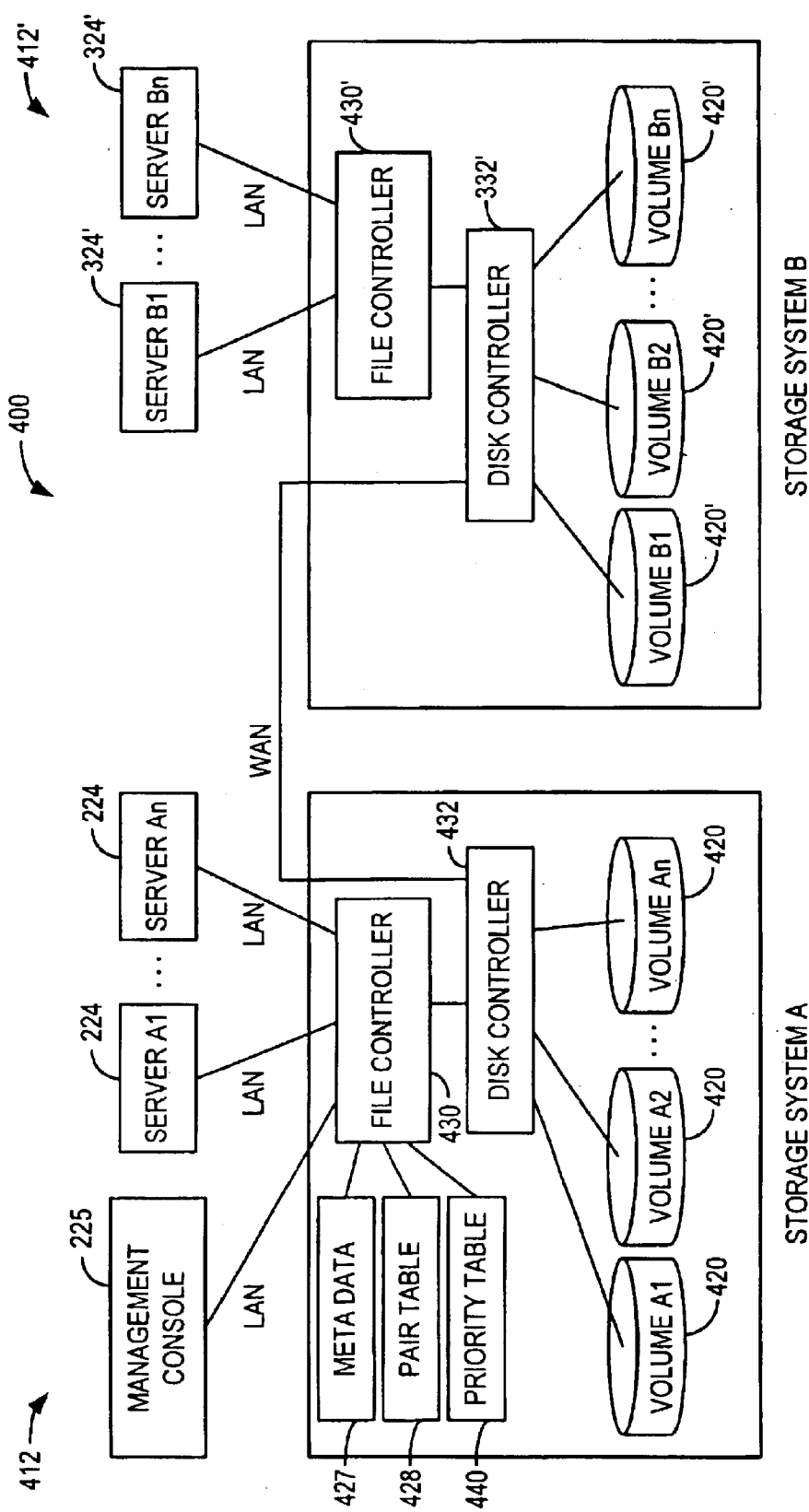
FIG. 11 is an illustration of another implementation of a storage system using file-level I/O protocols in the employment of the present invention.

FIG. 11 illustrates another file I/O—level storage system 400, showing the storage system as including a local storage facility 412 and a copy of that storage facility in the form of a remote storage system facility 412'. As with the storage facility 312 of FIG. 10, the local storage system 412 handles I/O read and write data requests between servers 224 and a storage media comprising volumes 420. The storage system 400 comprises a file controller 430 and a disk controller 432. The file controller, which handles file-level I/O data requests from the servers 224, communicates with the disk controller 432 which has direct access to the volumes 420, using block-level I/O. As with the storage system 310 of FIG. 10, the file controller 430 operates as a type of translation layer between file-level I/O and block-level I/O. The file controller 430 maintains a meta data table 437, a pair table 438, and a priority table 440, in the same manner that the file controller 330 of the storage system 310 manages its tables. The principal difference between the system shown in FIG. 11 and that of FIG. 10 is that it is the file controller 430 that communicates with the remote storage system 412 (via the file controller 430' of the remote storage system 412) using, for example, a wide area network (WAN). Thus, the file controller 430 will, in addition to a file I/O process, will also run a remote copy process, and maintain an RC queue (not shown). The file controller 430 operates essentially the same as described with respect to the file controller 330 (FIG. 10), with the exception that if a requested I/O data write operation is to a storage location for which there is an identified pair in the pair table 48, the file controller 430 will construct the remote copy messages that are inserted in the RC queue that the file controller maintains. Otherwise, operation of the file controller 430 and the disk controller 432 are basically as described above, as is the operation of the file controller 430 and 432' —except for the fact that the file controller 430' will receive the remote copy data to construct a write message for disk controller 432'.

FIG. 12 illustrates a pair table representation that may be used for a block level I/O storage system, such as the storage system of FIG. 1. As FIG. 12 shows, the pair table, designated generally with the reference numeral 600, has three major columns 602, 604, and 606 and multiple rows 610(1), 610(2), . . . 610(n). The two major columns 604, 606 are each split into two sub-columns 604a, 604b, and 606a, 606b, respectively. The column 602 identifies a pair by pair name (e.g., PAIR1, PAIR2, . . . PAIRN) while the columns 604, 606 identify, respectively, the local (primary) volumes and remote (secondary) volumes of each pair. The sub-columns 604a and 606a identify the storage system, and the sub-columns 604b and 606b identify the volumes of those storage systems. Not shown, but associated with the pair table 600 would be a priority table, listing the priority of each assigned to each pair.

Those skilled in this art will recognize that alternative constructions of the pair table can be made. For example, FIG. 13A illustrates a device table. A device may be a disk unit, a portion of a disk unit, or some other storage media device. Each row of the table shown in FIG. 13A identifies a device, a primary volume on that device at the local (primary) facility, and the corresponding secondary volume at the remote storage facility. FIG. 13B illustrates a division in which each pair contains multiple devices (e.g., disk units) and each device identifies the local and remote pairs to which data is written.

FIG. 14 illustrates one implementation of priority to the grouped version of block-level I/O storage pair tables. As FIG. 14 shows, each pair name identifies multiple devices, each device being assigned a separate priority.

FIG. 15 is an illustration of a pair table that may be used for a file level I/O storage system. It is basically the same as the pair table for a block level I/O storage system (as shown in FIG. 12) in that it has three columns: a column identifying the pair, a column identifying the primary or local file/directory, and a column identifying the secondary or remote file system. If a file name is specified, the file will be replicated and if a directory name is specified, the structure of the directory tree and files under the directory will be replicated. It should be apparent that there is no need to specify a secondary file or directory, because a file or a directory specified in the primary is replicated on the secondary file system with the same structure as the primary file system.

Any of the above-identified pair tables (except, of course, the pair table of FIG. 14 which has its own priority) can use a priority table much like disclosed in FIG. 3. However, there are a variety of ways of prioritizing pairs. For example, prioritization can be based upon the particular application implementing the write operation. A database application, for example, may have higher importance than a text editor application so that write operations initiated by the database application will be assigned a higher priority than those of the text editor. On the other hand, prioritization may be based upon the user. FIGS. 16 and 17, respectively, illustrate the formats of an RC request (FIG. 16) for a block level I/O system such as that shown in FIG. 1 or a file level I/O system (FIG. 17).

Turning first to FIG. 16, a representative RC request for a block line I/O system is shown: The request shows that the storage area modified by a write operation has been assigned a priority (2), an identification of the storage area at which the data is stored at the local storage system (storage system A, volume A1) and the location at which data will be copied at the remote storage system (storage system B, volume B2) the address within the particular volume (13) and the size of the data (8 KB). FIG. 17 illustrates an RC request in a file-level format. Again, the request will contain a priority level (2), an identification of the local and remote storage areas (storage system A, file system A1; storage system B, file system B2), the name of the file (/USR/file 1) the file offset (520) and the size of the file (1024).

The decision as to how to select which remote copy request to send can be made in various ways. For example, the RC queue 44 (FIG. 1) may be periodically reviewed first for those remote copy requests having the highest priority, and when one is found, present the request for transmission to the remote storage facility via the WAN connection. Then, or if no request of the priority of the search is found, search for remote copy requests of the next highest priority, and so on.

Or, preferably, the remote copy requests can be placed on the RC queue 44 in a first-come, first-serve basis. The remote copy process 34 may then periodically review the RC queue 44 to find the remote copy request(s) of a certain (higher than others) priority placed on the queue earlier and send them, i.e., the RC queue would be structured to operate as a FIFO on a prioritized bases. Alternatively, if something other than a queue structure is used, each copy request could be provided a time stamp that indicates a time at which the request was generated or stored. The remote copy process 34 would then search through the structure containing the remote copy requests for those having the highest assigned priority. Then, search through any found and present them for transmission to the remote storage facility according to the time stamp.

In sum, there has been disclosed a remote copy method, and apparatus for implementing that method for updating remotely located copies of data maintained at a local storage facility on a prioritized basis to ensure that changes to critical data is mirrored at a remote storage facility as soon as possible and does not have to wait for transfers of less critical data.

What is claimed is:

1. A storage system for data communicated between the storage system and at least one processor unit, comprising:
    a first storage unit coupled to the processor unit and having a plurality of first storage areas for storing data written in response to data requests from the processor unit, the first storage unit maintaining a pair table identifying storage area pairs, each of the storage area pairs being one of the plurality of first storage areas and, for each such storage area, a corresponding second storage area;
    a second storage unit communicatively coupled to the first storage location and including the corresponding second storage areas; and
    a priority table associated with the pair table having assigned priority values for each of the number of storage area pairs;
    wherein, the first storage unit receives requests to write data to a ones of the first storage areas to communicate the data to the second storage unit to write the data to ones of the second storage areas corresponding to the one first storage areas identified in the pair table according to the assigned priority.

2. The storage system of claim 1, wherein the first and second storage areas are formed on a plurality of disk storage units.

3. A method of protecting data stored on a storage system at a first location, the data being stored in a plurality of predetermined first storage areas in response to data write requests from a processor system, including the steps of:
    providing a remote storage system at a second location different from the first location; the second storage system having a second storage area corresponding to each of the plurality of first storage areas;
    maintaining a pair table at the first location containing a number of pair identifications, each of the number pair identifications corresponding to each of the first storage areas and the corresponding one of the second storage areas, there being a priority value associated with each of the number of pair identifications; and
    receiving requests for write data to ones of the plurality first storage areas to transmit the data written to the remote storage system for storage at ones of the plurality of second storage areas corresponding to the first storage areas as specified in the pair table based upon the priority value associated with each of the ones of the pairs.

4. A method of storing data, including the steps of:
    maintaining a plurality of first data storage areas at a first location for storing data in response to write requests;
    providing a plurality of second data storage areas at a second location remote from the first location;
    having an identification of each of the plurality of first data storage areas and the corresponding one of the plurality of second data storage areas;
    assigning a priority to each of the identifications; and
    receiving a request to write data to a first one of the plurality of first storage areas to transmit the data for storage at the corresponding second storage area according to the priority associated therewith.

5. A storage system, comprising:
    a local storage media for storing data that can be read therefrom;
    a local controller for receiving write requests to write data to the storage media, the controller maintaining a remote copy queue for storing remote copy messages
    a remote storage system, including a remote storage media;
    the local controller operating to receive a number of write requests to prepare and store in the copy queue a copy message for each of the number of write requests with a prioritization assigned to each of the copy messages stored in the copy queue such that at least a one of the copy messages has a prioritization higher that the other of the copy messages, then sending the copy messages with the data of the corresponding write requests to the remote storage system for storage according to the assigned prioritization.

6. The storage system of claim 5, including a pair table maintained by the local controller to identify each of a plurality of predetermined storage areas of the local storage media and a corresponding one of a plurality of storage areas of the remote storage media, each of the number of write requests containing an identification of a one of the storage areas at which data is to be written.

7. The storage system of claim 6, wherein each of the copy messages includes an identification of the pair of storage areas corresponding to the local storage area to which data is written.

* * * * *